US011984089B2

(12) United States Patent
Jan et al.

(10) Patent No.: US 11,984,089 B2
(45) **Date of Patent: *May 14, 2024**

(54) DISAGGREGATION DRIVING SEQUENCES FOR FOUR PARTICLE ELECTROPHORETIC DISPLAYS

(71) Applicant: E INK CORPORATION, Billerica, MA (US)

(72) Inventors: Ning-Wei Jan, New Taipei (TW); Chen-Kai Chiu, Taoyuan (TW); Feng-Shou Lin, Tainan (TW); Chih-Yu Cheng, Taipei (TW)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,498

(22) Filed: Apr. 25, 2023

(65) Prior Publication Data

US 2023/0260471 A1 Aug. 17, 2023

(51) Int. Cl.
*G09G 3/34* (2006.01)

(52) U.S. Cl.
CPC ..... *G09G 3/344* (2013.01); *G09G 2320/0242* (2013.01)

(58) Field of Classification Search
CPC ........... G09G 3/344; G09G 2320/0242; G09G 3/2003; G09G 2310/068
See application file for complete search history.

(56) References Cited

U.S. PATENT DOCUMENTS

| | | | |
|---|---|---|---|
| 6,241,921 | B1 | 6/2001 | Jacobson et al. |
| 6,672,921 | B1 | 1/2004 | Liang et al. |
| 6,788,449 | B2 | 9/2004 | Liang et al. |
| 6,866,760 | B2 | 3/2005 | Paolini, Jr. et al. |
| 6,922,276 | B2 | 7/2005 | Zhang et al. |
| 6,930,818 | B1 | 8/2005 | Liang et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,046,228 | B2 | 5/2006 | Liang et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,312,784 | B2 | 12/2007 | Baucom et al. |
| 7,411,719 | B2 | 8/2008 | Paolini, Jr. et al. |
| 7,453,445 | B2 | 11/2008 | Amundson |
| 7,535,624 | B2 | 5/2009 | Amundson et al. |

(Continued)

OTHER PUBLICATIONS

Korean Intellectual Property Office, "International Search Report and Written Opinion", PCT/US2022/026651, Aug. 12, 2022.

*Primary Examiner* — David D Davis
(74) *Attorney, Agent, or Firm* — Brian D. Bean

(57) ABSTRACT

The present invention provides improved driving methods for four particle electrophoretic displays that improves the performance of such displays when they are deployed in low temperature environments and the displays are required to be updated when positioned vertically (i.e., the driving electric fields are substantially perpendicular to the direction of Earth's gravity). Methods are provided for displaying each of the colors at each pixel, as desired, with minimal interference (contamination) from the other particles.

8 Claims, 11 Drawing Sheets

(56) References Cited

U.S. PATENT DOCUMENTS

| | | | | |
|---|---|---|---|---|
| 7,679,814 | B2 | 3/2010 | Paolini, Jr. et al. | |
| 7,715,088 | B2 | 5/2010 | Liang et al. | |
| 7,839,564 | B2 | 11/2010 | Whitesides et al. | |
| 8,009,348 | B2 | 8/2011 | Zehner et al. | |
| 8,717,664 | B2 | 5/2014 | Wang et al. | |
| 9,279,906 | B2 | 3/2016 | Kang | |
| 9,285,649 | B2 | 3/2016 | Du et al. | |
| 9,513,527 | B2 | 12/2016 | Chan et al. | |
| 9,812,073 | B2 | 11/2017 | Lin et al. | |
| 9,839,144 | B2 | 12/2017 | Chuang et al. | |
| 10,162,242 | B2 | 12/2018 | Wang et al. | |
| 10,339,876 | B2 | 7/2019 | Lin et al. | |
| 10,431,168 | B2 | 10/2019 | Lin et al. | |
| 10,444,553 | B2 | 10/2019 | Laxton | |
| 10,586,499 | B2 | 3/2020 | Lin | |
| 10,891,906 | B2 | 1/2021 | Lin | |
| 11,151,951 | B2 | 10/2021 | Lin et al. | |
| 11,688,357 | B2 * | 6/2023 | Jan | G09G 3/2003<br>345/209 |
| 2007/0164982 | A1 | 7/2007 | Zhou | |
| 2008/0150886 | A1 | 6/2008 | Johnson | |
| 2011/0199671 | A1 | 8/2011 | Amundson et al. | |
| 2014/0011913 | A1 | 1/2014 | Du et al. | |
| 2015/0005720 | A1 | 1/2015 | Zang et al. | |
| 2015/0138256 | A1 | 5/2015 | Yamada | |
| 2016/0012710 | A1 | 1/2016 | Lu et al. | |
| 2019/0333454 | A1 * | 10/2019 | Lin | G09G 3/344 |
| 2020/0379312 | A1 | 12/2020 | Wu et al. | |

* cited by examiner

Horizontal

Vertical

DISAGGREGATION DRIVING SEQUENCES FOR FOUR PARTICLE ELECTROPHORETIC DISPLAYS

REFERENCE TO RELATED APPLICATIONS

This application is a continuation of U.S. patent application Ser. No. 17/731,497 filed Apr. 28, 2022, which claims priority to U.S. Provisional Patent Application No. 63/181,514, filed Apr. 29, 2021. The entire contents of all patents and publications mentioned below are herein incorporated by reference in their entireties.

FIELD OF THE INVENTION

The present invention is directed to improved driving methods for a color electrophoretic display device in which each pixel can display at least four high-quality color states.

BACKGROUND OF THE INVENTION

Electrophoretic displays (electronic paper, ePaper, etc.), such as commercially-available from E Ink Holdings (Hsinchu, Taiwan), have advantages of being light, durable, and eco-friendly because they consume very little power. The technology has been incorporated into electronic readers (e.g., electronic book, eBook) and other display environments (e.g., phones, tablets, electronic shelf tags, hospital signage, road signs, mass transit time tables). The combination of low power consumption and sunlight readability has allowed for rapid growth in so called "no-plug and play" operations in which a digital signage system is merely attached to a surface and interfaces with exiting communication networks to provide regular updates of information or images. Because the display is powered with a battery or solar collector, there is no need to run utilities or even have a plug dangling from the display.

A variety of color options for electrophoretic displays have recently become available, ranging from improved color filter arrays, to complex subtractive pigment sets, to high-fidelity color options that rely on multiple sets of reflective color particles. This last system has seen great acceptance for commercial signage, such as in food stores, clothiers, and electronics retailers. In particular, three-color electrophoretic displays of the type described in U.S. Patent Application No. 2020/0379312 have been rapidly adopted for outdoor and indoor signage, and for room-temperature as well as refrigerated food sections. U.S. Patent Application No. 2020/0379312 is incorporated herein by reference in its entirety.

Whereas three-particle electrophoretic displays of U.S. Patent Application No. 2020/0379312, and U.S. Pat. Nos. 8,717,664, 10,162,242, and 10,339,876 have been deployed to millions of individual displays worldwide, there is strong demand for adding a fourth particle with a fourth color, such as described in U.S. Pat. Nos. 9,285,649, 9,513,527, and 9,812,073. Such four-color displays are not currently available commercially. While it is hoped that such four-particle electrophoretic displays can be "dropped into" the same retail environments, initial testing suggests that four-particle electrophoretic systems of the type above have unique quirks, different from three-particle systems, depending upon the temperature of operation, as well as the orientation of the displays, i.e., horizontal (charged pigments driven up and down along the Earth's gravitational field) versus vertical (charged pigments driven back and forth across the Earth's gravitational field). One surprising effect observed is that when such four-particle electrophoretic displays are used in a cold environment, e.g., a refrigerated or frozen food section, the particles aggregate in unexpected ways, which results in black pixels having intermittent contamination by the other colors, e.g., white, yellow, and red. Interestingly, this phenomenon cannot be entirely reproduced when the displays are driven horizontally at cold temperatures. Clearly, there is a need for improved driving sequences to disaggregate the pigments prior to addressing in order to achieve the desired color performance and to meet customer demands for pure and vibrant colors in electronic digital signage.

SUMMARY OF THE INVENTION

The driving methods disclosed herein overcome the shortcomings described above for addressing a four-particle electrophoretic display at colder temperatures in a typical environment, i.e., wherein the display panel is oriented vertically. In a first aspect, a method of driving a display layer disposed between a viewing surface including a light-transmissive electrode and a second surface on the opposed side of the display layer from the viewing surface, the second surface including a driving electrode, the display layer including an electrophoretic medium comprising a fluid and first, second, third and fourth types of particles dispersed in the fluid, wherein the first, second, third and fourth types of particles have respectively first, second, third, and fourth optical characteristics differing from one another, the first and third types of particles having charges of a first polarity and the second and fourth types of particles having charges of a second polarity, opposite the first polarity, and the first and third types of particles do not have the same charge magnitudes, and the second and fourth types of particles do not have the same charge magnitudes, the method comprising the following steps in order:

(i) applying a first electric field having a high magnitude and the first or second polarity to drive the first or second types of particles towards the viewing surface, thereby causing the display layer to display the first or second optical characteristic at the viewing surface;

(ii) applying a second electric field having the high magnitude and a negative polarity;

(iii) applying a shaking pulse including at least four periods of the high magnitude electric field at the first polarity and at least four periods of the high magnitude electric field at the second polarity;

(iv) applying a second electric field having the high magnitude and the same polarity as step (i) to again drive the first or second types of particles towards the viewing surface, thereby causing the display layer to again display the first or second optical characteristic at the viewing surface;

(v) applying a third electric field having a low magnitude and a polarity opposite to step (iv) to drive the fourth or third types of particles towards the viewing surface, thereby causing the display layer to display the fourth or third optical characteristic at the viewing surface.

In some embodiments, the first electric field is applied for a longer time than the second electric field, and the third electric field is applied for a longer time than the second electric field. In some embodiments, each of steps (i)-(v) are repeated. In some embodiments, the magnitude of the third electric field is less than 50 percent of the magnitude of the second electric field. In some embodiments, only the fourth or the third optical characteristic is displayed after completion of step (v). In some embodiments, the first electric field is applied for more than 400 ms. In some embodiments, the second electric field is applied for more than 100 ms. In some embodiments, the shaking pulse is applied for less than 80 ms. In some embodiments, the shaking pulse is applied for about 40 ms. In some embodiments, a rest period of no electric field is performed after step (iii), and steps (i)-(iii) are repeated a second time before completing steps (iv) and (v). In some embodiments, each electric field is applied in a direction that is substantially perpendicular to the direction of Earth's gravity.

In a second aspect, the invention provides a method of driving a display layer disposed between a viewing surface including a light-transmissive electrode and a second surface on the opposed side of the display layer from the viewing surface, the second surface including a driving electrode, the display layer including an electrophoretic medium comprising a fluid and first, second, third and fourth types of particles dispersed in the fluid, wherein the first, second, third and fourth types of particles have respectively first, second, third, and fourth optical characteristics differing from one another, the first and third types of particles having charges of a first polarity and the second and fourth types of particles having charges of a second polarity, opposite the first polarity, and the first and third types of particles do not have the same charge magnitudes, and the second and fourth types of particles do not have the same charge magnitudes, the method comprising the following steps in order:

(i) applying a first electric field having a high magnitude and the first or second polarity to drive the first or second types of particles towards the viewing surface, thereby causing the display layer to display the first or second optical characteristic at the viewing surface;

(ii) applying a second electric field having the high magnitude and a negative polarity;

(iii) applying a shaking pulse including at least four periods of the high magnitude electric field at the first polarity and at least four periods of the high magnitude electric field at the second polarity;

(iv) applying a third electric field having the high magnitude and the opposite polarity as step (i) to drive the second or first types of particles towards the viewing surface, thereby causing the display layer to display the second or first optical characteristic at the viewing surface.

In some embodiments, the first electric field is applied for the same time as the third electric field. In some embodiments, each of steps (i)-(iv) are repeated. In some embodiments, only the second or the first optical characteristic is displayed after completion of step (iv). In some embodiments, the first electric field is applied for more than 400 ms. In some embodiments, the second electric field is applied for more than 100 ms. In some embodiments, each period of the shaking pulse is applied for less than 80 ms. In some embodiments, each period of the shaking pulse is applied for about 40 ms. In some embodiments, each electric field is applied in a direction that is substantially perpendicular to the direction of Earth's gravity.

DETAILED DESCRIPTION OF THE INVENTION

As already mentioned, the present invention relates to a driving method for a display layer comprising an electrophoretic medium containing first, second, third and fourth types of particles all dispersed in a fluid and all having differing optical characteristics. These optical characteristics are typically colors perceptible to the human eye, but may be other optical properties, such as optical transmission, reflectance, luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable.

The four types of particles present in the electrophoretic medium may be regarded as comprising two pairs of oppositely charged particles. The first pair (the first and second types of particles) consists of a first type of positive particles and a first type of negative particles; similarly, the second pair (third and fourth types of particles) consists of a second type of positive particles and a second type of negative particles. Of the two pairs of oppositely charged particles, one pair (the first and second particles) carries a stronger charge than the other pair (third and fourth particles). Therefore the four types of particles may also be referred to as high positive particles, high negative particles, low positive particles and low negative particles.

The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913 and/or may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse™ 17000, available from Lubrizol Corporation, a Berkshire Hathaway company), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

Figure 1:
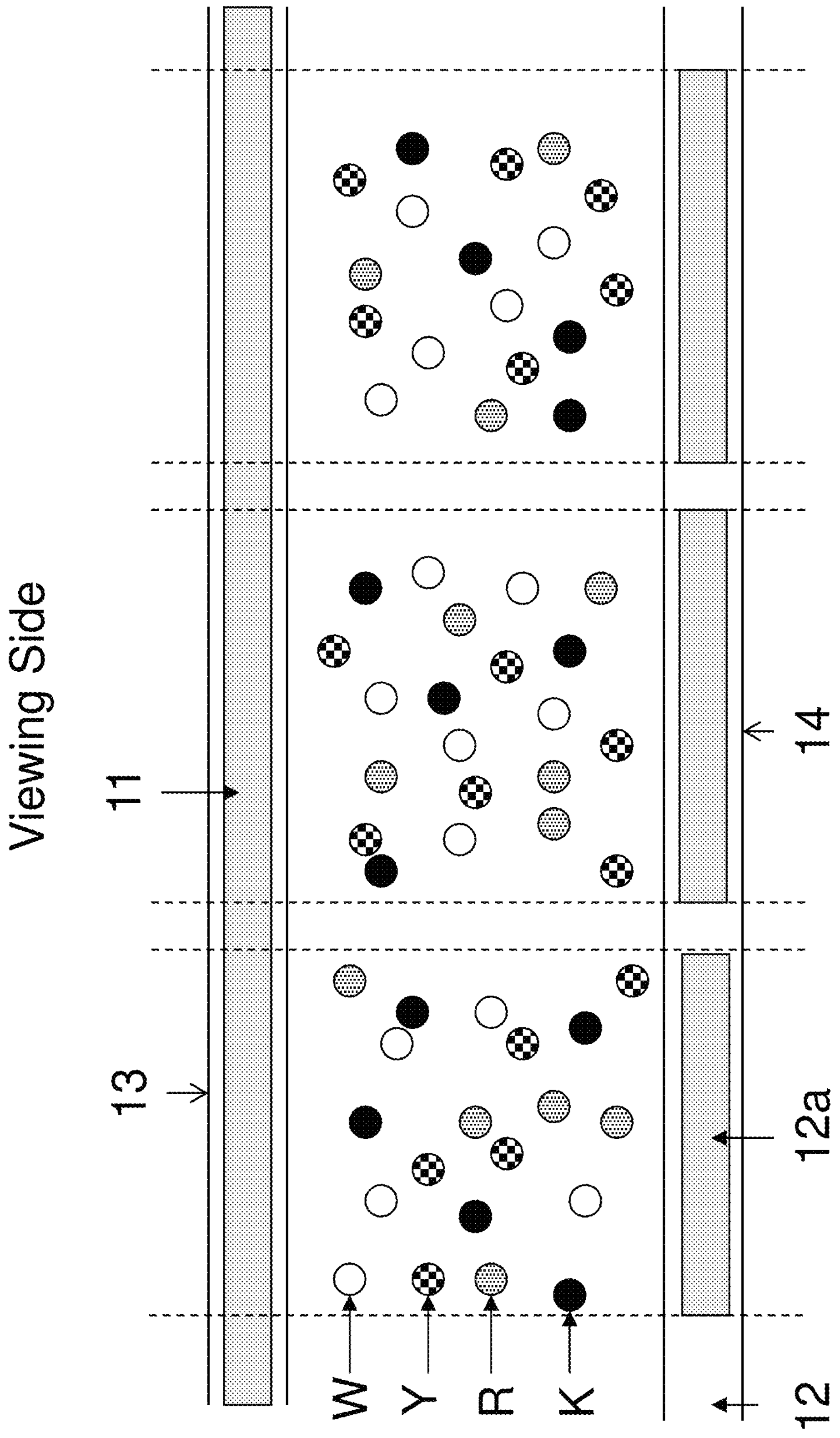
FIG. 1 is a schematic cross-section through a display layer containing four different types of particles and capable of displaying four different color states.

As an example shown in FIG. 1, first, black particles (K) and second, yellow particles (Y) are the first pair of oppositely charged particles, and in this pair, the black particles are the high positive particles and the yellow particles are the high negative particles. Third, red particles (R) and fourth, white particles (W) are the second pair of oppositely charged particles, and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles. In another example not shown, the black particles may be the high positive particles; the yellow particles may be the low positive particles; the white particles may be the high negative particles and the red particles may be the low negative particles. In another example not shown, the black particles may be the high positive particles; the red particles may be the low positive particles; the white particles may be the high negative particles and the yellow particles may be the high negative particles. Of course, any particular color may be replaced with another color as required for the application. For example, if a specific combination of black, white, green, and red particles were desired, the high negative yellow particles shown in FIG. 1 could be replaced with high negative green particles.

In addition, the color states of the four types of particles may be intentionally mixed. For example, yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

The particles are preferably opaque, in the sense that they should be light reflecting not light transmissive. It be apparent to those skilled in color science that if the particles were light transmissive, some of the color states appearing in the following description of specific embodiments of the invention would be severely distorted or not obtained. White particles are of course light scattering rather than reflective but care should be taken to ensure that not too much light passes through a layer of white particles. For example, if in the white state shown in FIG. 2F, discussed below, the layer of white particles allowed a substantial amount of light to pass through, and be reflected from the black and yellow particles behind it, the brightness of the white state could be substantially reduced.

In some embodiments, the particles are primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

White particles may be formed from an inorganic pigment, such as $TiO_2$, $ZrO_2$, ZnO, $Al_2O_3$, $Sb_2O_3$, $BaSO_4$, $PbSO_4$ or the like. Black particles may be formed from CI pigment black 26 or 28 or the like (e.g., manganese ferrite black spinel or copper chromite black spinel) or carbon black. The other colored particles (which are non-white and non-black) may be red, green, blue, magenta, cyan, yellow or any other desired colored, and may be formed from, for example, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. The colored particles may also be inorganic pigments, such as red, green, blue and yellow. Examples may include, but are not limited to, CI pigment blue 28, CI pigment green 50 and CI pigment yellow 227.

The fluid in which the four types of particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Numerous patents and applications assigned to or in the names of the Massachusetts Institute of Technology (MIT), E Ink Corporation, E Ink California, LLC, E Ink Holdings, Prime View International, and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and U.S. Pat. No. 6,788,449.

Preferred embodiments of the invention will now be described in detail, though by way of illustration only, with reference to the accompanying drawings.

FIG. 1 is a schematic cross-section through a display layer which can be driven by methods of the present invention. The display layer has two major surfaces, a first, viewing surface 13 (the upper surface as illustrated in FIG. 1) through which a user views the display, and a second surface 14 on the opposed side of the display layer from the first surface 13. The display layer comprises an electrophoretic medium comprising a fluid and first, black particles (K) having a high positive charge, second, yellow particles (Y) having a high negative charge, third, red particles (R) have a low positive charge, and fourth, white particles (W) having a low negative charge. The display layer is provided with electrodes as known in the art for applying electric fields across the display layer, i.e., including two electrode layers, the first of which is a light-transmissive or transparent common electrode layer 11 extending across the entire viewing surface 13 of the display layer. This electrode layer 11 may be formed from indium tin oxide (ITO) or a similar light-transmissive conductor. The other electrode layer 12 is a layer of discrete pixel electrodes 12*a* on the second surface 14, these electrodes 12*a* defining individual pixel of the display, these pixels being indicated by dotted vertical lines in FIG. 1. Alternatively, the other electrode layer 12 could be a solid electrode, e.g., a metal foil, or a graphite plane, or a conductive polymer. Alternatively, electrode layer 12 could also be a light-transmissive or transparent electrode layer, similar to transparent common electrode layer 11.

An electric field is created for a pixel by the potential difference between a voltage applied to the common electrode and a voltage applied to the corresponding pixel electrode. The pixel electrodes 12*a* may form part of an active matrix driving system with, for example, a thin film transistor (TFT) backplane, but other types of electrode addressing may be used provided the electrodes provide the necessary electric field across the display layer.

The pixel electrodes may be described in U.S. Pat. No. 7,046,228. The pixel electrodes 12*a* may form part of an active matrix thin film transistor (TFT) backplane, but other types of electrode addressing may be used provided the electrodes provide the necessary electric field across the display layer.

In one embodiment, the charge carried by the “low charge” particles may be less than about 50%, preferably about 5% to about 30%, of the charge carried by the “high charge” particles. In another embodiment, the “low charge” particles may be less than about 75%, or about 15% to about 55%, of the charge carried by the “high charge” particles. In a further embodiment, the comparison of the charge levels as indicated applies to two types of particles having the same charge polarity. The charges on the “high positive” particles and the “high negative” particles may be the same or different. Likewise, the amplitudes of the “low positive” particles and the “low negative” particles may be the same or different. In any specific electrophoretic fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

FIGS. 2A-2F illustrate the four color states which can be displayed at the viewing surface of each pixel of the display layer shown in FIG. 1 and the transitions between them. As previously noted, the high positive particles are of a black color (K); the high negative particles are of a yellow color (Y); the low positive particles are of a red color (R); and the low negative particles are of a white color (W).

Figures 2A, 2B:
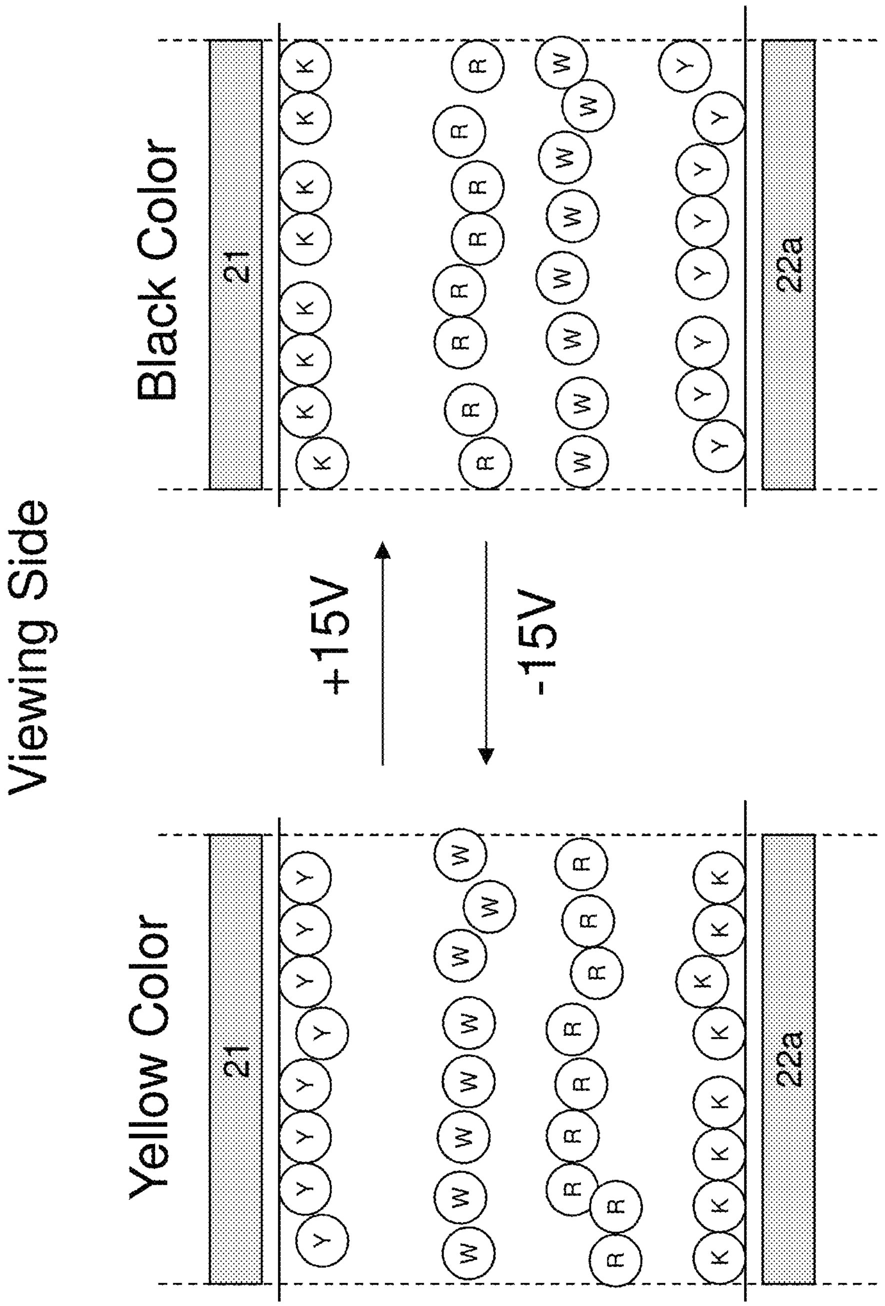
FIGS. 2A-2F are schematic cross-sections similar to those of FIG. 1 but illustrating changes in particle positions as a result of applying driving sequences of particular charge and polarity.

In FIGS. 2A and 2B, when a high negative driving voltage (referred to below as $V_{H2}$, e.g., −15V, e.g., −30V) is applied to the pixel electrode 22*a* (hereinafter, it will be assumed that the common electrode 21 will be maintained at 0V, so in this case the common electrode is strongly positive relative to the pixel electrode) for a time period of sufficient length, an electric field is generated to cause the high negative yellow particles to be driven adjacent the common electrode 21 and the high positive black particles driven adjacent the pixel electrode 22*a* to produce the state of FIG. 2A.

The low positive red R and low negative white W particles, because they carry weaker charges, move slower than the higher charged black and yellow particles and as a result, they stay in the middle of the pixel, with white particles above the red particles, and with both masked by the yellow particles and therefore not visible at the viewing surface. Thus, a yellow color is displayed at the viewing surface.

Conversely, when a high positive driving voltage (referred to below as $V_{H1}$, e.g., +15V, e.g., +30V) is applied to the pixel electrode 22*a* (so that the common electrode 21 is strongly negative relative to the pixel electrode) for a time period of sufficient length, an electric field is generated to cause the high positive black particles to be driven adjacent the common electrode 21 and the high negative yellow particles adjacent the pixel electrode 22*a*. The resulting state of FIG. 2B is the exact inverse of FIG. 2A and a black color is displayed at the viewing surface.

Figures 2C, 2D:
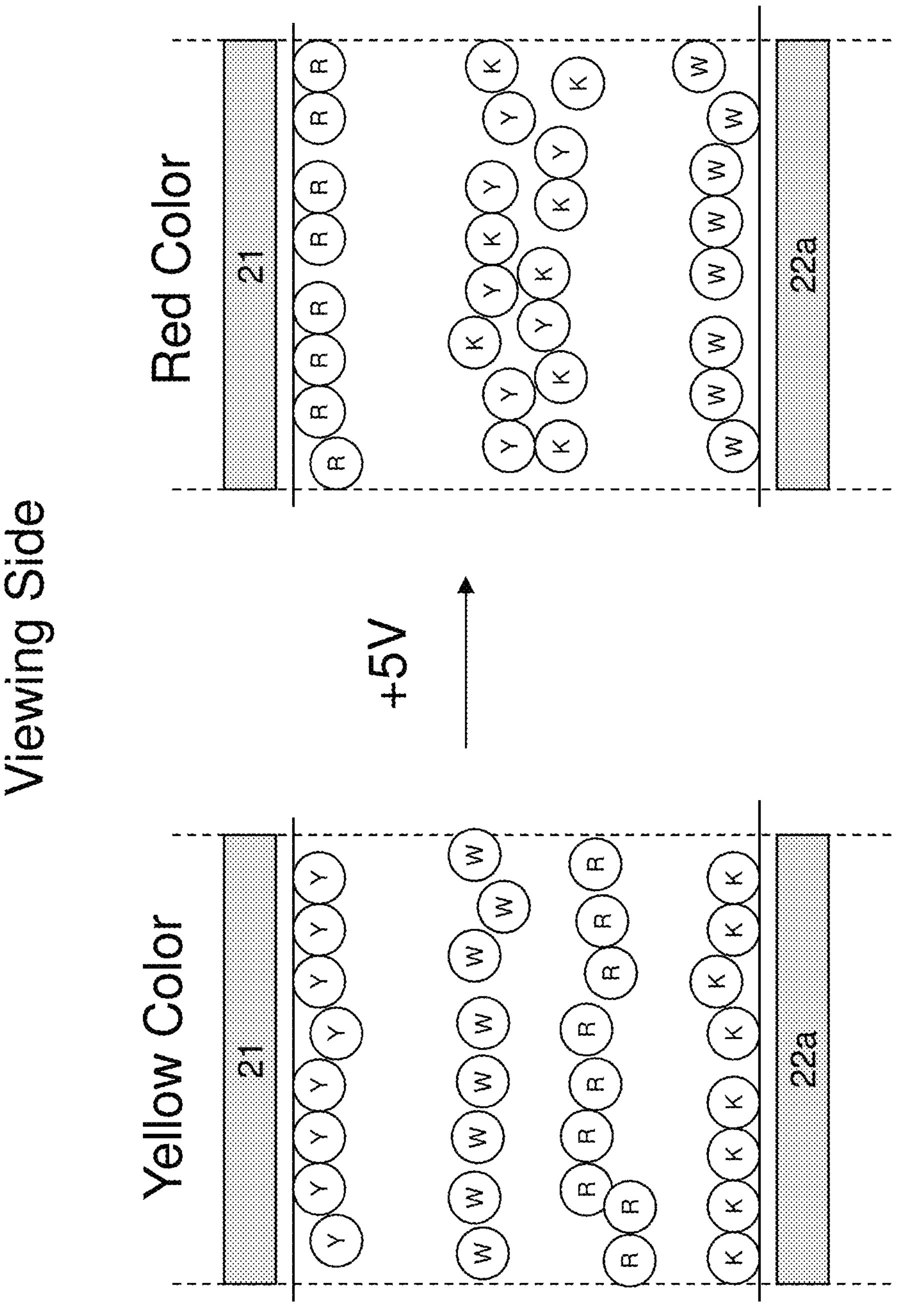

FIGS. 2C and 2D illustrate the manner in which the low positive (red) particles are displayed at the viewing surface of the display layer shown in FIG. 1. The process starts from the (yellow) state shown in FIG. 2A and repeated as FIG. 2C. A low positive voltage ($V_{L1}$, e.g., +3V, e.g., +5V, e.g., +10V) is applied to the pixel electrode 22*a* (i.e., the common electrode 21 is made slightly negative with respect to the pixel electrode) for a time period of sufficient length to cause the high negative yellow particles to move towards the pixel electrode 22*a* while the high positive black move towards the common electrode 21. However, when the yellow and black particles meet intermediate the pixel and common electrodes as shown in FIG. 2D, they remain at the intermediate position because the electric field generated by the low driving voltage is not strong enough to overcome the attractive forces between them. As shown, the yellow and black particles stay intermediate the pixel and common electrodes in a mixed state.

The term “attractive force” as used herein, encompasses electrostatic interactions, linearly dependent on the particle charge potentials, and the attractive force can be further enhanced by other forces, such as Van der Waals forces, hydrophobic interactions and the like.

Obviously, attractive forces also exist between the low positive red particles and the high negative yellow particles, and between the low negative white particles and the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is also sufficient to separate the low negative white and low positive red particles, thereby causing the red particles to move adjacent the common electrode 21 and the white particles to move adjacent the pixel electrode 22*a*. As a result, the pixel displays a red color, while the white particles lie closest to the pixel electrode, as shown in FIG. 2D.

Figures 2E, 2F:
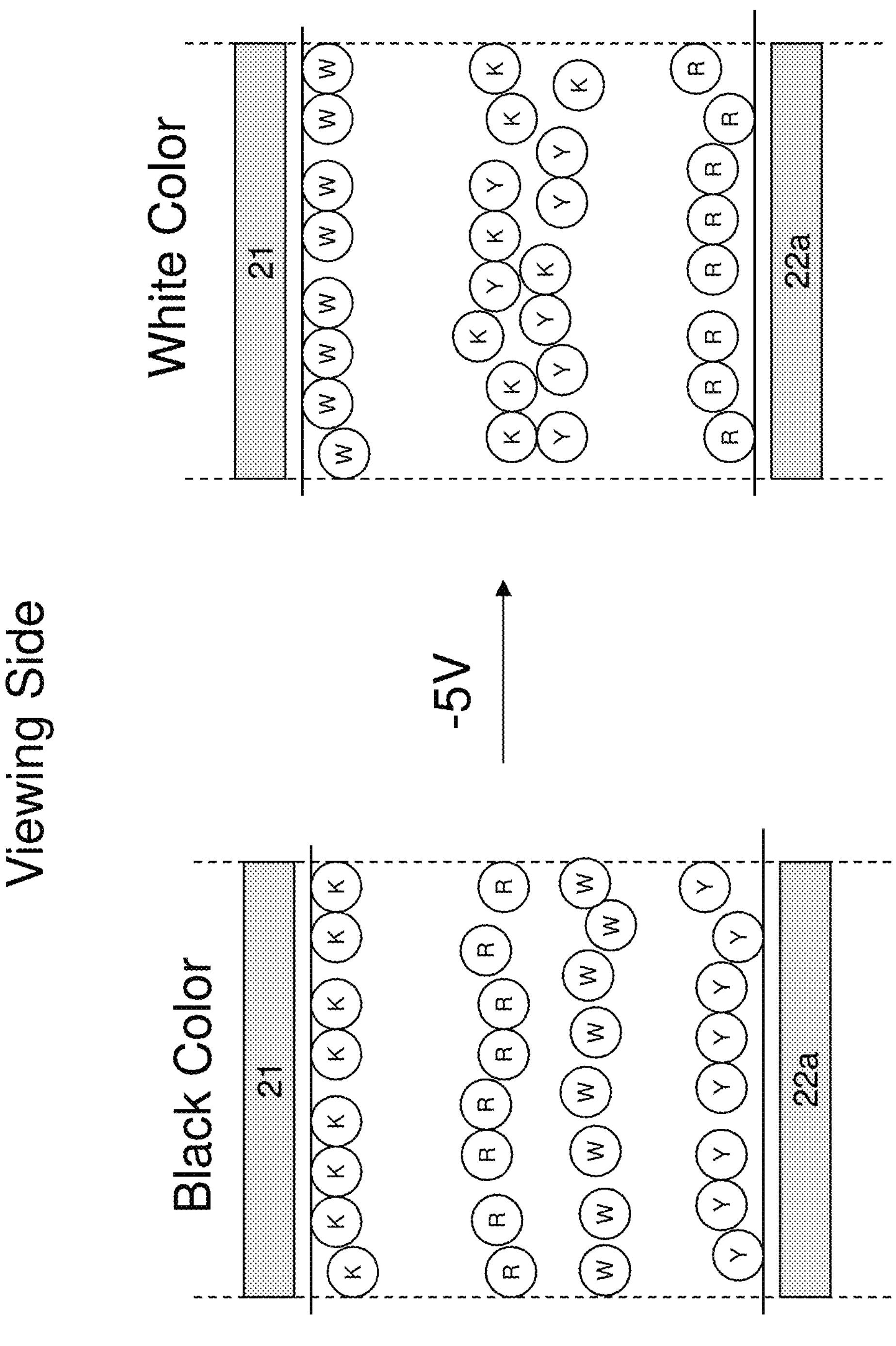

FIGS. 2E and 2F illustrate the manner in which the low negative (white) particles are displayed at the viewing surface of the display shown in FIG. 1. The process starts from the (black) state of FIG. 2B and repeated as FIG. 2E. A low negative voltage ($V_{L2}$, e.g., −3V, e.g., −5V, e.g., −10V) is applied to the pixel electrode (i.e., the common electrode is made slightly positive with respect to the pixel electrode) for a time period of sufficient length to cause the high positive black particles to move towards the pixel electrode 22*a* while the high negative yellow particles move towards the common electrode 21. However, when the yellow and black particles meet intermediate the pixel and common electrodes as shown in FIG. 2F, they remain at the intermediate position because the electric field generated by the low driving voltage is not strong enough to overcome the attractive forces between them. Thus, as previously discussed with reference to FIG. 2D, the yellow and black particles stay intermediate the pixel and common electrodes in a mixed state.

As discussed above with reference to FIGS. 2C and 2D, attractive forces also exist between the low positive red particles and the high negative yellow particles, and between the low negative white particles and both the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode 21 and the red particles to move adjacent the pixel electrode 22*a*. As a result, the pixel displays a white color, while the red particles lie closest to the pixel electrode, as shown in FIG. 2F.

In the display layer shown in FIGS. 1 and 2A-2F the black particles (K) carry a high positive charge, the yellow particles (Y) carry a high negative charge, the red (R) particles carry a low positive charge and the white particles (W) carry a low negative charge, however in principle, the particles carrying a high positive charge, or a high negative charge, or a low positive charge or a low negative charge may be of any colors. All of these variations are intended to be within the scope of this application.

It should also be noted that the low potential difference applied to reach the color states of FIGS. 2D and 2F may be about 5% to about 50% of the high potential difference required to drive the pixel from the color state of high positive particles to the color state of the high negative particles, or vice versa, i.e., as shown in FIGS. 2A and 2B.

Although for ease of illustration, FIGS. 1 and 2A-2F show the display layer as unencapsulated, the electrophoretic fluid may be filled into display cells, which may be cup-like microcells as described in U.S. Pat. No. 6,930,818. The display cells may also be other types of micro-containers, such as microcapsules, microchannels or equivalents, regardless of their shapes or sizes. All of these are within the scope of the present application.

It will readily be apparent to those skilled in imaging science that if "clean", well saturated colors are to be obtained in the various color states illustrated in FIGS. 2A-2F, all non-black and non-white particles used in the electrophoretic medium should be light-reflecting rather than light-transmissive. (White particles are inherently light-scattering, while black particles are inherently light-absorbing.) For example, in the red color state of FIG. 2D, if the red particles were substantially light-transmissive, a substantial proportion of the light entering the electrophoretic layer through the viewing surface would pass through the red particles and a proportion of this transmitted light would be reflected back from the yellow particles "behind" (i.e., below as illustrated in FIG. 2D) the red particles. The overall effect would be serious "contamination" of the desired red color with a yellow tinge, a highly undesirable result.

Figure 3:
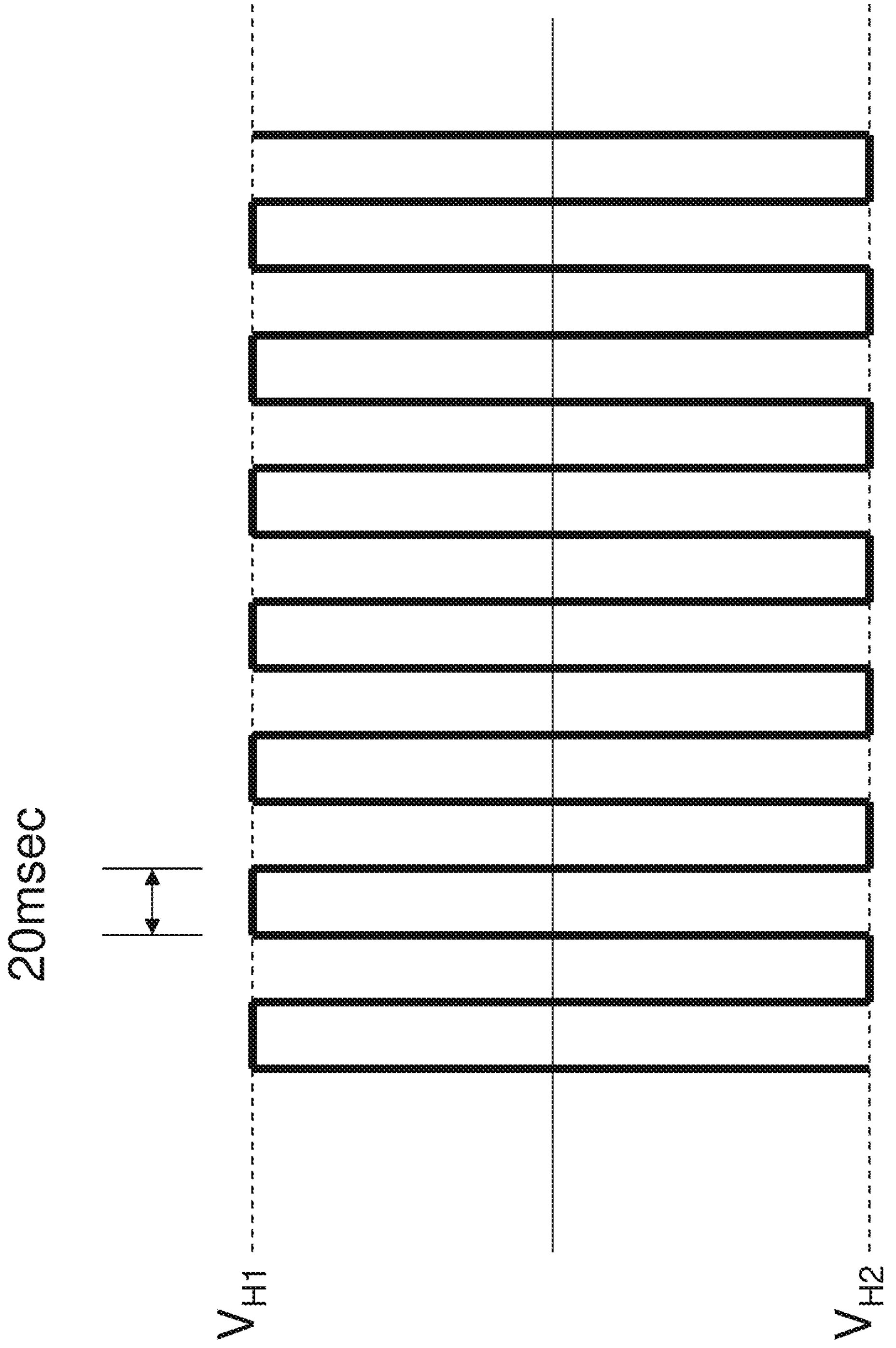
FIG. 3 shows a generic "shaking" waveform which may be used in the driving methods of the invention. When used with an active matrix display, the time width of each cycle (+HV to −HV) is at least two times the frame time for that display. However, there is no physical limitation to driving the electrophoretic medium, and the time width of each cycle may be shorter or longer than typical with an active matrix display.

In order to ensure both color brightness and color purity, a shaking waveform may be applied prior to driving the display layer from one color state to another color state. FIG. 3 is a voltage versus time graph of such a shaking waveform. The shaking waveform may consist of repeating a pair of opposite driving pulses for many cycles. When used with an active matrix display each positive or negative pulse is at least the frame width of an update. For example, each pulse width may be on the order of 16 msec, when a display is updated at 60 Hz. However, in fact, the frame times are typically a bit longer due to various charge and decay times for the capacitive elements of the backplane. For example, as shown in FIG. 3, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 3 illustrates only seven pairs of pulses.

The pulse width need not be limited to the frame time, and each pulse may include multiple frames, e.g., 40 msec pulse width, e.g, 60 msec pulse width, e.g, 80 msec pulse width, e.g., 100 msec pulse width. In some embodiments the pulse width of each element of the shaking pulse may be 80 msec or less, e.g., 60 msec or less, e.g., 40 msec or less, e.g., 20 msec or less. In practice, there may be at least 4 repetitions (i.e., four pairs of positive and negative pulses), e.g. at least 6 repetitions, e.g. at least 8 repetitions, e.g. at least 10 repetitions, e.g. at least 12 repetitions, e.g. at least 15 repetitions. Similarly, all subsequent drawings showing shaking waveforms simplify the shaking waveform in the same manner. The shaking waveform may be applied regardless of the optical state prior to a driving voltage being applied. After the shaking waveform is applied, the optical state (at either the viewing surface or the second surface, if visible) will not be a pure color, but will be a mixture of the colors of the various types of pigment particles. In some instances multiple shaking pulses will be delivered with a pause of 0V between shaking pulses to allow the electrophoretic medium to equilibrate and/or allow accumulated charge on the electrodes to dissipate.

Each of the driving pulses in the shaking waveform is applied for not exceeding 50% (or not exceeding 30%, 10% or 5%) of the driving time required for driving from the color state of the high positive particles to the color state of the high negative particles, or vice versa. For example, if it takes 300 msec to drive a display device from the color state of FIG. 2B, to the high positive particles to the color state of FIG. 2A, or vice versa, the shaking waveform may consist of positive and negative pulses, each applied for not more than 150 msec. In practice, it is preferred that the pulses be shorter.

For present purposes, a high driving voltage ($V_{H1}$ or $V_{H2}$) is defined as a driving voltage which is sufficient to drive a pixel from the color state of high positive particles to the color state of high negative particles, or vice versa (see FIGS. 2A and 2B). A low driving voltage ($V_{L1}$ or $V_{L2}$) is defined as a driving voltage which may be sufficient to drive a pixel to the color state of low charged particles from the color state of high charged particles (see FIGS. 2D and 2F). In general, the magnitude of $V_L$ (e.g., $V_{L1}$ or $V_{L2}$) is less than 50%, or preferably less than 40%, of the amplitude of $V_H$ (e.g., $V_{H1}$ or $V_{H2}$).

Figure 4A:
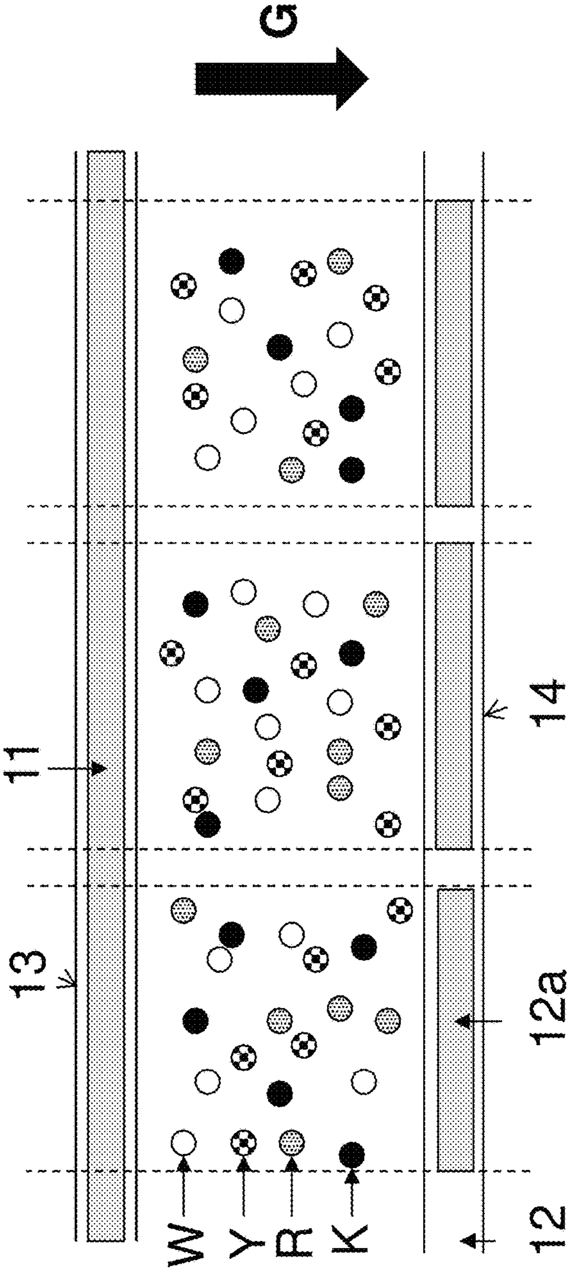
FIG. 4A illustrates horizontal driving of a display of the invention.
Figure 4B:
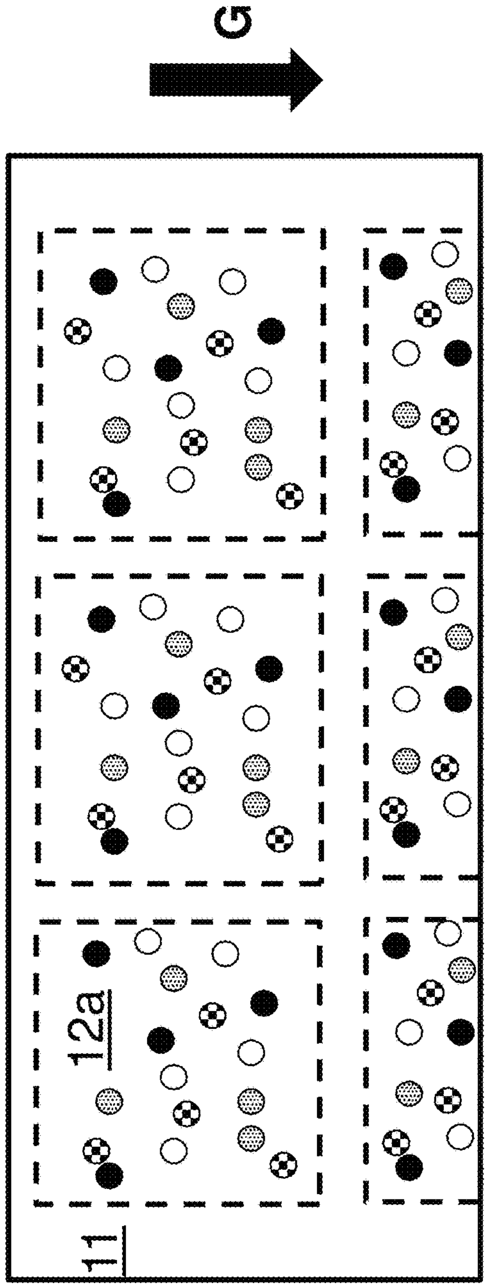
FIG. 4B illustrates vertical driving of a display of the invention.

As mentioned in the Background, the orientation of the electrophoretic medium with respect to gravity influences the purity of the resulting color states, especially when the displays are operated at lower temperatures, e.g., 5° C. or less, e.g., 0° C. or less, e.g., −5° C. or less, e.g., −10° C. or less, e.g., −15° C. or less. As shown in FIG. 4A, horizontal driving is when the electrical field gradient provided by the electrodes (11 and 12*a*) is along the direction of gravity (G). In contrast, vertical driving is when the electrical field gradient provided by the electrodes (11 and 12*a*) is transverse to the direction of gravity (G).

Empirical measurements of the black state using CIELAB color space (e.g., L*, a*, b*), have shown that black pixels driven, e.g., as described in FIGS. 2A and 2B, have a consistently higher L* for black pixels driven in a vertical orientation as compared the same display driven in horizontal orientation. (For a black state, lower L* is better, i.e., less reflective.) Additionally, using an eye loupe or similar magnification, a viewer can see the extra specks of white, yellow, and red pigment contaminating the black state. Using a predetermined test pattern, the L* value for black is typically about 3L* higher in a vertically-driven four particle panel driven at 0° C. as compared to a horizontally-driven four particle panel driven at 0° C. While it is not as prominent, all color states are observed to have increased contamination when driven in the vertical orientation, especially at low temperatures. The cause of this color contamination is not entirely understood, however it may result from differential density separation of various components in the electrophoretic medium, including the pigments, charge control agents, and other additives.

Figure 5A:
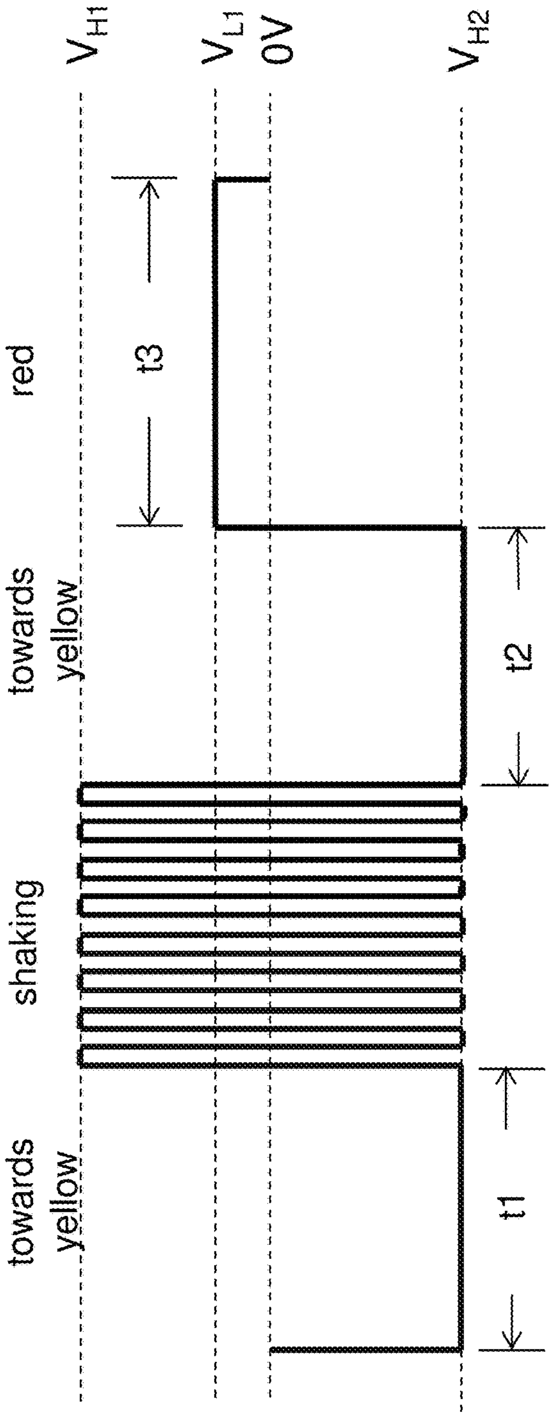
FIG. 5A illustrates a driving sequence (waveform) that can be used to cause the display layer shown in FIG. 1 to effect the transition from FIG. 2C to FIG. 2D, thereby displaying red at the viewing surface.

FIG. 5A illustrates a standard waveform that may be used to effect the yellow to red (high negative to low positive) transition of FIGS. 2C and 2D. In the waveform of FIG. 5A, a high negative driving voltage ($V_{H2}$, e.g., −15V) is applied for a period of t1 to drive the pixel towards the yellow state (see FIG. 2C). This initial application of a high negative driving voltage may is known as the balance phase and is included to ensure that the entire waveform of FIG. 5A is DC balanced. (The term "DC balanced" is used herein to mean that the integral of the driving voltage applied to a pixel with respect to time taken over an entire waveform is substantially zero.) The balance pulse of t1 may last for 500 ms or more, e.g., longer than 1 sec. A shaking waveform (a.k.a. mixing waveform) is then applied, followed by application of the high negative driving voltage ($V_{H2}$) for a period of t2, which places the pixel in the yellow state shown in FIG. 2C. The width of period t2 is typically smaller than t1, for example half as long, e.g., about 200 ms, or about 250 ms, or about 500 ms. In some embodiments of FIG. 5A, each pulse of the shaking pulse may be about 80 ms wide, however longer or shorter pulse widths are acceptable. From this yellow state, the pixel is driven to the red state by applying a low positive driving voltage ($V_{L1}$, for example +3V) for a period of t3, to effect the yellow-to-red transition shown going from FIG. 2C to FIG. 2D. The period t2 is sufficient to drive the pixel to the yellow state when $V_{H2}$ is applied and the period t3 is sufficient to drive the pixel to the red state from the yellow state when $V_{L1}$ is applied. The period t3 is typically longer than t2, e.g., about 300 ms, e.g., about 400 ms, e.g, about 600 ms. It is understood that the waveform of FIG. 5A is a "base" waveform for preparation of red at the viewing surface. Portions of the waveform may be repeated, for example the balance pulse and the shaking pulse may be repeated before the first driving pulse is applied. In some embodiments, there may be a pause of 0V between repeated portions of the waveform, i.e., balance, shake, pause, balance, shake. Additionally, clean up pulses may be added to the waveform as described in U.S. Pat. No. 10,586,499, which is incorporated by reference in its entirety.

Figure 5B:
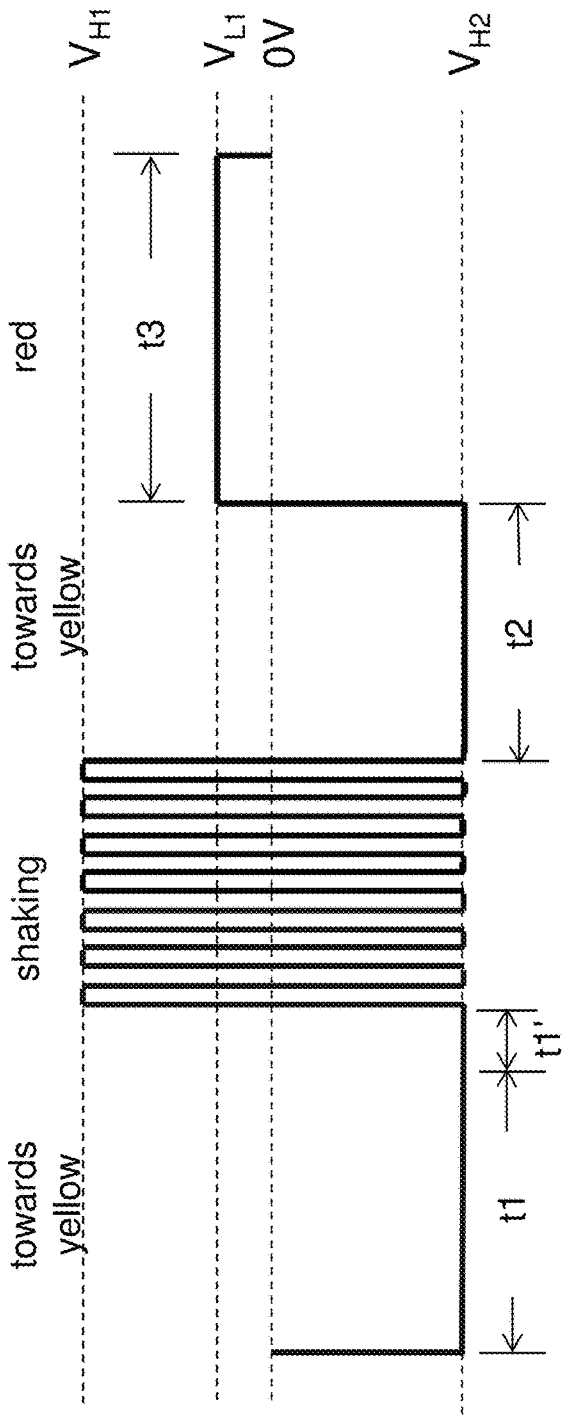
FIG. 5B illustrates an improved driving sequence (waveform) of the invention that provides better particle separation when effecting the transition from FIG. 2C to FIG. 2D, thereby displaying red at the viewing surface.

However, as discussed previously, the waveform of FIG. 5A does not provide sufficient initial separation of aggregated pigment to achieve a pure optical state, especially when driven at low temperatures (e.g., 0° C.) and in vertical orientation. That is, after driving with a waveform of FIG. 5A, black, yellow, and white pigment contamination can be seen in the red pixels. It has been found, surprisingly, that this contamination can be overcome by adding a simple high negative disaggregation pulse at time t1' as shown in FIG. 5B. Whereas this extra high negative time appears as an extension of the balance pulse t1, the disaggregation pulse t1' is found to be effective in the preparation of all color states for the described four particle electrophoretic display system, e.g., of the type described above with respect to FIGS. 1 and 2A-2F. The period t1' is typically between 100 ms and 700 ms, e.g., about 400 ms, or about 500 ms, or between 400 and 500 ms.

While the inventors do not wish to be bound by the following proposed mechanism, it is surmised that the positively-charged black and red particles are developing aggregates after sustained driving, especially at colder temperatures. The particle aggregates may be facilitated by charge control agents in the electrophoretic medium, however, the effect does not seem to be sensitive to specific types of charge control agents. When the negative disaggregation pulse, i.e., t1' of FIG. 5B is added, the red and black particles are driven closer to the drive electrode (22*a*), which results in a higher dispersion force (i.e., a sharper "kick") to the positive-particle aggregates when the shaking pulses begin. Accordingly, the positive particles are better separated, and respond better to the later driving (i.e., addressing) pulses. With the addition of the disaggregating pulse, there is less color mixing, and the resulting color is more consistent when evaluated with electro-optic metrology (see Example).

Figure 6A:
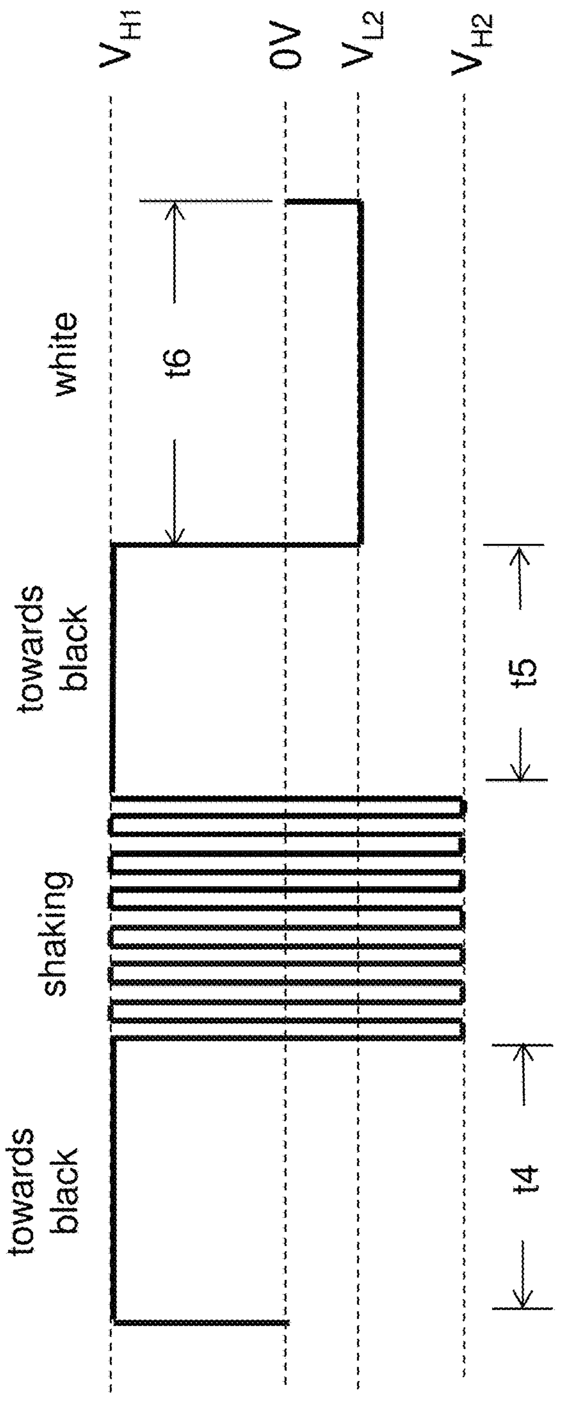
FIG. 6A illustrates a driving sequence (waveform) that can be used to cause the display layer shown in FIG. 1 to effect the transition from FIG. 2E to FIG. 2F, thereby displaying white at the viewing surface.
Figure 6B:
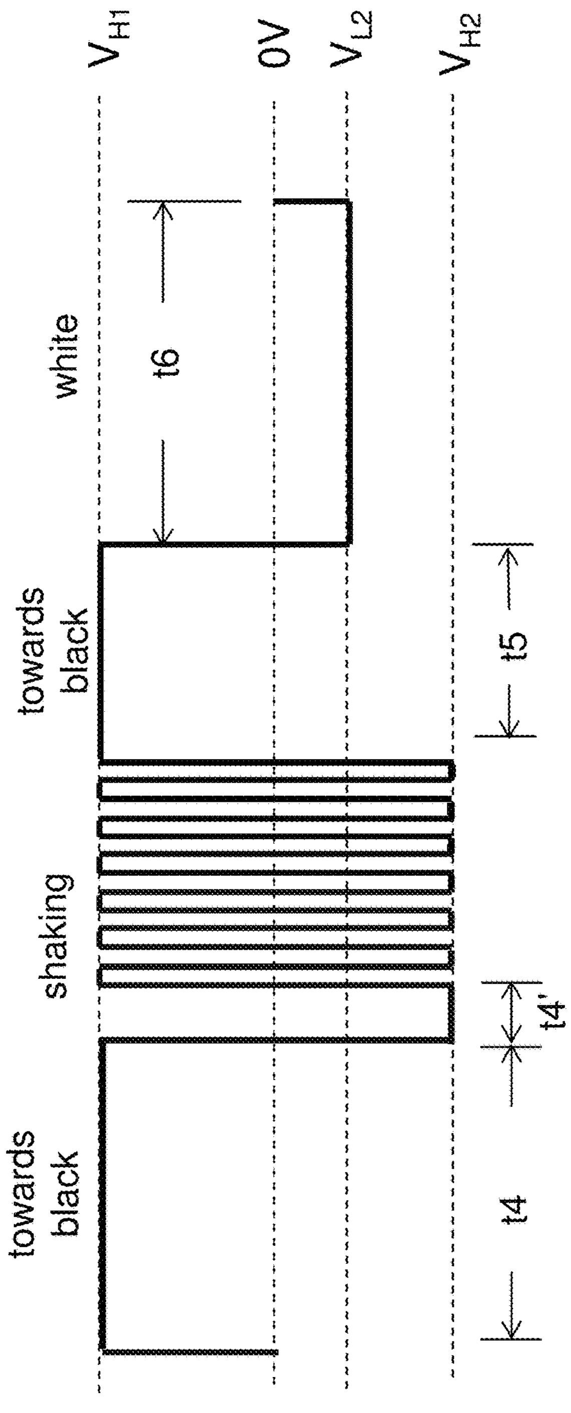
FIG. 6B illustrates an improved driving sequence (waveform) of the invention that provides better particle separation when effecting the transition from FIG. 2E to FIG. 2F, thereby displaying white at the viewing surface.

In a similar fashion, FIGS. 6A and 6B illustrate waveforms that may be used to effect the black-to-white (high positive to low negative) transition from FIG. 2E to FIG. 2F. The waveform or FIG. 6A is the standard waveform, while the waveform of FIG. 6B is modified to include a disaggregation pulse t4' to reduce the contamination in the resultant white state. In the waveform of FIG. 6A, which is essentially an inverted version of the waveform of FIG. 5A, a high positive driving voltage for example +15V) is applied as a balance pulse for a period of t4. A shaking waveform is then applied, followed by application of the high positive driving voltage ($V_{H1}$) for a period of t5, thus ensuring that the pixel is in the black state shown in FIG. 2E. From this black state, the pixel is driven to the white state by applying a low negative driving voltage ($V_{L2}$, for example −3V) for a period of t6, to effect the black-to-white transition shown in from FIG. 2E to FIG. 2F. The period t5 is sufficient to drive the pixel to the black state when $V_{H1}$ is applied and the period t6 is sufficient to drive the pixel to the white state from the black state when $V_{L2}$ is applied. The disaggregation pulse t4' shown in FIG. 6B improves the purity of the final white state, especially when the display is drive in a vertical orientation at cold temperatures. The period t4' is typically between 100 ms and 700 ms, e.g., about 400 ms, or about 500 ms, or between 400 and 500 ms.

Figure 7A:
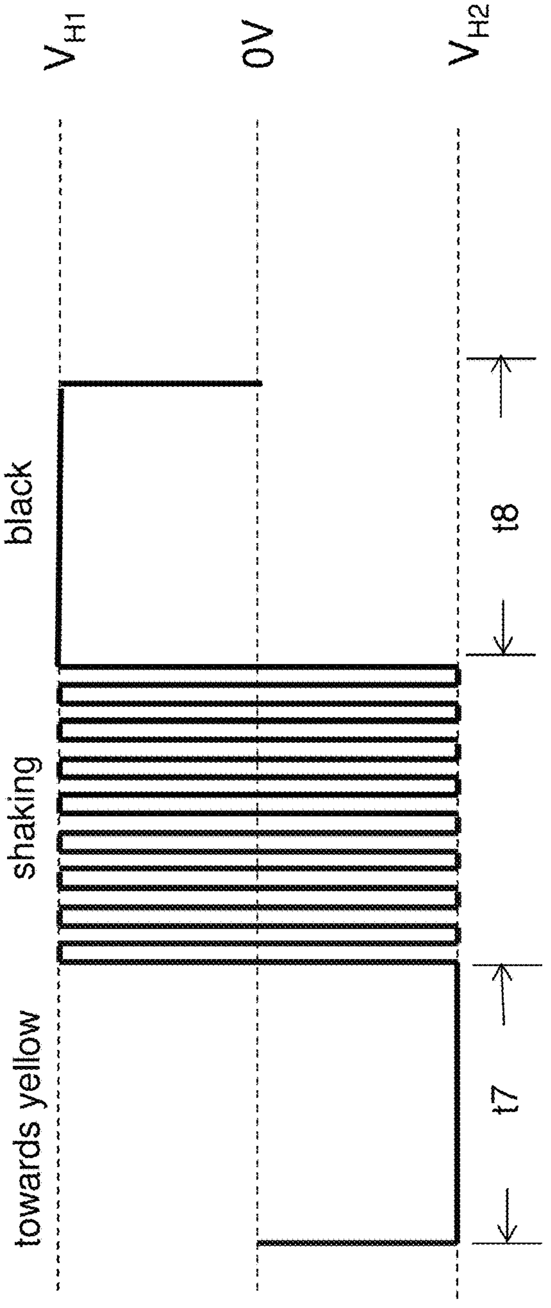
FIG. 7A illustrates a driving sequence (waveform) that can be used to cause the display layer shown in FIG. 1 to effect the transition from FIG. 2A to FIG. 2B, thereby displaying black at the viewing surface.

FIG. 7A illustrates a standard waveform that may be used to effect the yellow to black (high negative to high positive) transition of FIGS. 2A to 2B. A balance pulse of width t7 and having the high negative voltage is delivered prior to a shaking waveform. The balance pulse achieves DC balance for the entire waveform and the shaking pulse is included to ensure color brightness and purity. Following the balance and shaking pulses, as shown in FIG. 7A, a high positive driving voltage ($V_{H1}$, e.g., +15V, +30V) is applied for a period t8 to drive a pixel towards a black state after the shaking waveform.

As detailed above and described in the Example below, the waveform of FIG. 7A does not achieve the purity of black that is desired, especially for low temperature driving when the display is in a vertical orientation. Accordingly, in a fashion similar to the waveforms of FIGS. 5B and 6B, it has been found that the addition of a high negative pulse for an intermediate time t7' achieve disaggregation of the particles, resulting in improved black state electro-optic performance. As in FIGS. 5B and 6B, the period t7' is typically between 100 ms and 700 ms, e.g., about 400 ms, or about 500 ms, or between 400 and 500 ms.

Figure 8A:
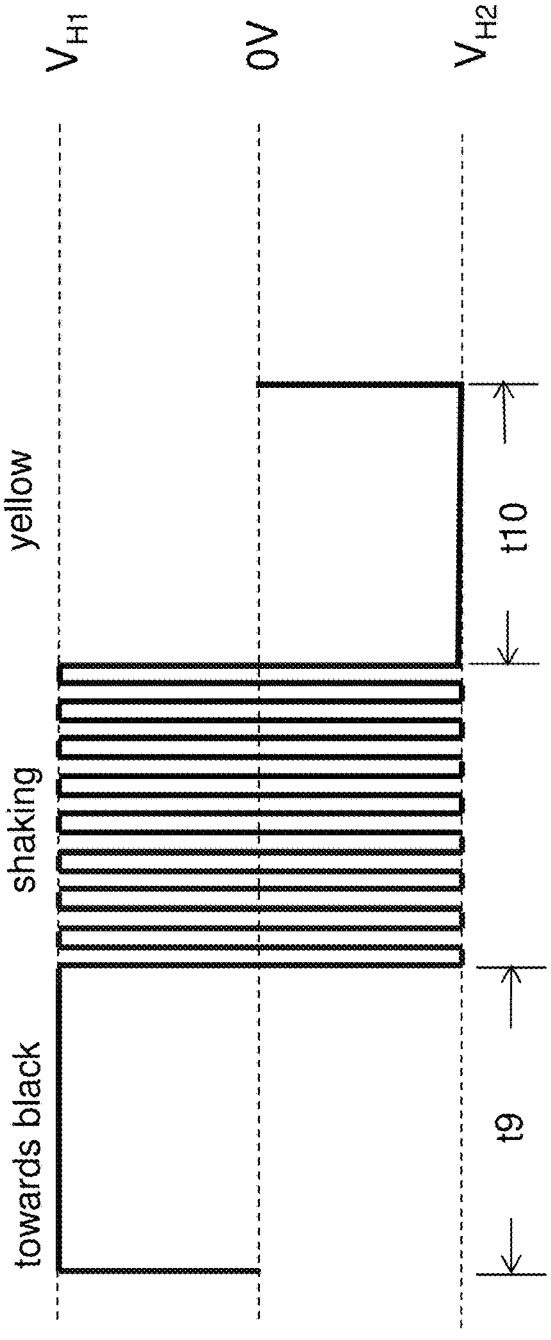
FIG. 8A illustrates a driving sequence (waveform) that can be used to cause the display layer shown in FIG. 1 to effect the transition from FIG. 2B to FIG. 2A, thereby displaying yellow at the viewing surface.
Figure 8B:
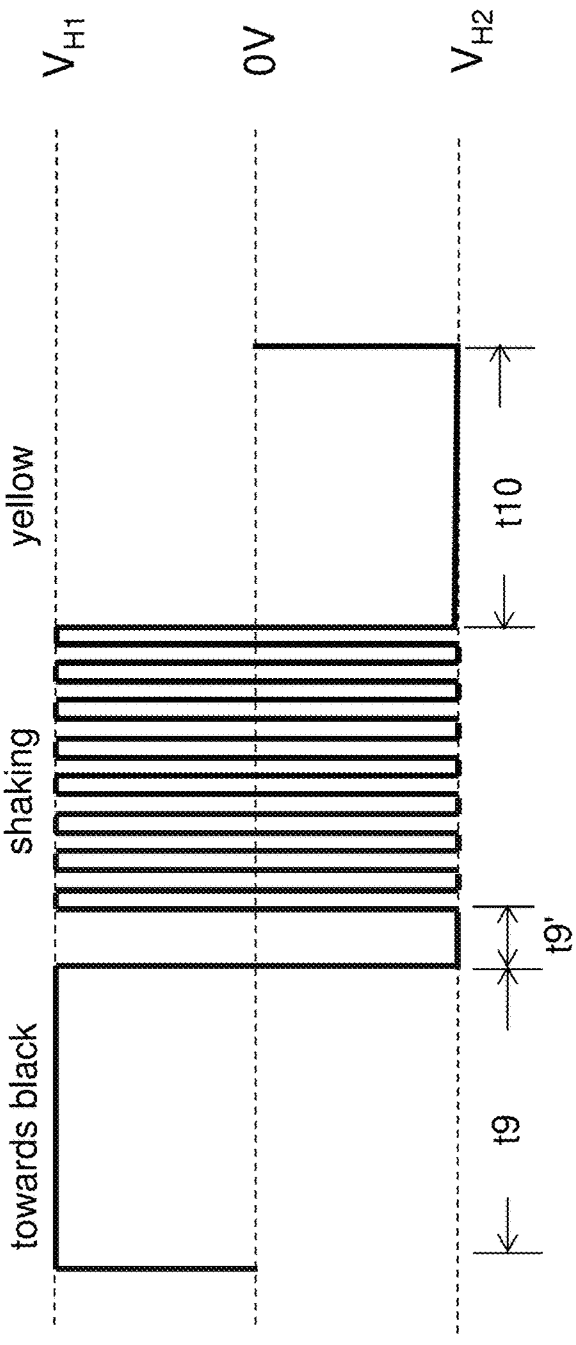
FIG. 8B illustrates an improved driving sequence (waveform) of the invention that provides better particle separation when effecting the transition from FIG. 2B to FIG. 2A, thereby displaying yellow at the viewing surface.

FIG. 8A illustrates a standard waveform that may be used to effect the black to yellow (high positive to high negative) transition of FIGS. 2B to 2A. A balance pulse of width t9 and having the high negative voltage is delivered prior to a shaking waveform. The balance pulse achieves DC balance for the entire waveform and the shaking pulse is included to ensure color brightness and purity. Following the balance and shaking pulses, as shown in FIG. 8A, a high negative driving voltage ($V_{H2}$, e.g., −15V, −30V) is applied for a period t10 to drive a pixel towards a yellow state after the shaking waveform.

Figure 7B:
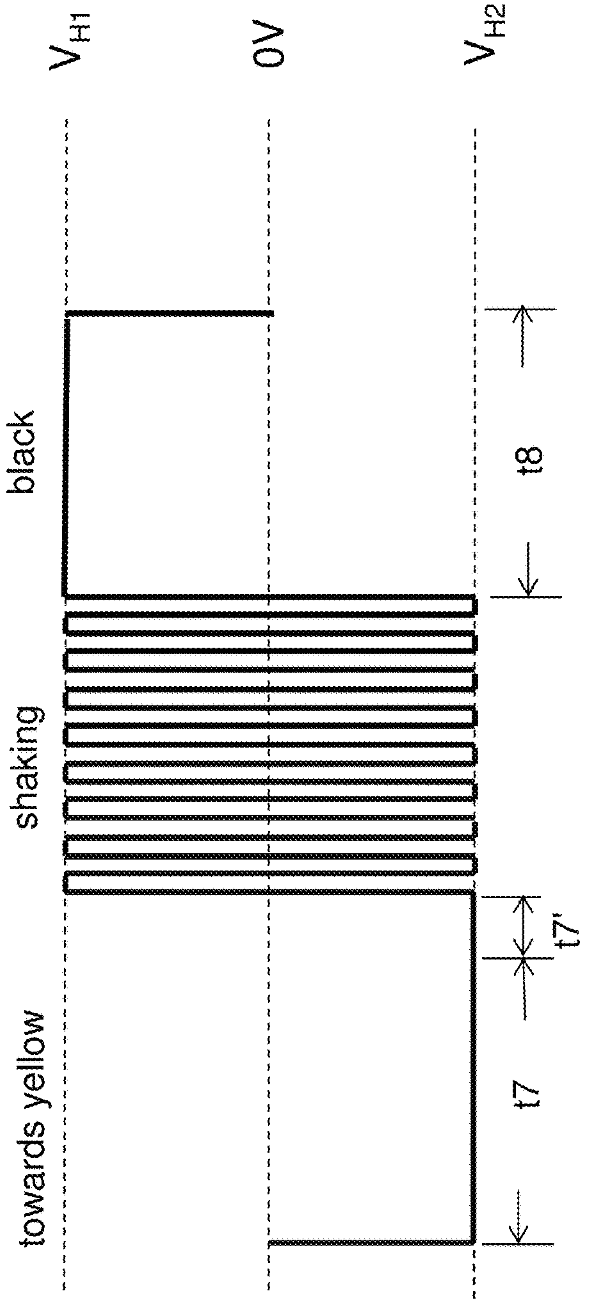
FIG. 7B illustrates an improved driving sequence (waveform) of the invention that provides better particle separation when effecting the transition from FIG. 2A to FIG. 2B, thereby displaying black at the viewing surface.

As detailed above, the waveform of FIG. 8A does not achieve the purity of yellow that is desired, especially for low temperature driving when the display is in a vertical orientation. Accordingly, in a fashion similar to the waveforms of FIG. 7B, it has been found that the addition of a high negative pulse for an intermediate time t9' achieve disaggregation of the particles, resulting in improved black state electro-optic performance. As in FIG. 7B, the period t9' is typically between 100 ms and 700 ms, e.g., about 400 ms, or about 500 ms, or between 400 and 500 ms.

The waveforms described thus far have been intended to display one of the four optical states shown in FIGS. 2A-2F, essentially the color of one of the four types of particles present in the display layer. It will be seen from the foregoing that while the embodiments of the invention previously described allow for the display of any one of four colors at each pixel, they do not provide an easy method for reproducibly controlling the gray level of each color or the degree of saturation thereof. Accordingly, if it is desired to use the present invention to provide gray scale color images, it will be necessary to dither (areally modulate) the pixels of the display to provide the necessary gray scale. For example, a desaturated red (pink) color could be displayed by setting alternating pixels of the display to red and white. Areal modulation in effect trades an increased number of gray levels for a reduction in display resolution (since the individual pixels are in effect used as sub-pixels of a larger pixel capable of gray level display), and the loss in resolution can be limited by increasing the number of reproducible color states (primaries) which can be displayed at each pixel. It has been found that the number of primaries available from each pixel in the methods of the present invention can be increased by driving each pixel to the color (orange in the embodiments shown in the drawings) presented by a mixture of the low positive (red) particles and the high negative (yellow) particles, and/or to the color (gray) presented by a mixture of the low negative (white) particles and the high positive (black) particles.

It has been found that a reproducible mixed colors can only be obtained by first driving the display to the color of the low charged particle required in the mixed color and then applying a high driving voltage of a polarity which causes the appropriate high charged particle to mix with the low charged particle to form the desired mixed color. More specifically, to provide a reproducible orange color it is necessary to start from the red state. To transition from this red state 2 to an orange state, i.e., mixed red and yellow, a high negative driving voltage ($V_{H2}$, e.g. −15V) is applied to the pixel electrode (22*a*) (i.e., the common electrode is made strongly positive relative to the pixel electrode) for a brief period. The high driving voltage is sufficient to overcome the interactions between the black and yellow particles previously aggregated intermediate the pixel and front electrodes, so that the negatively charged yellow particles start moving rapidly towards the front electrode (21) while the positively charged black particles start moving towards the pixel electrode (22*a*). Simultaneously, the positively charged red particles begin moving away from the front electrode (21) towards the pixel electrode (22*a*), while the negatively charged white particles begin moving away from the pixel electrode (22*a*) towards the front electrode (21). However, because the electrophoretic mobilities of the low charged red and white particles are smaller than those of the high charged black and yellow particles, the red and white particles move more slowly than the black and yellow particles. The length of driving pulse is adjusted such that a mixture of red and yellow particles is present adjacent the front electrode (21) so that an orange color is seen at the viewing surface. A mixture of black and white particles is present adjacent the pixel electrode (22*a*) so that a gray color will be visible through the second surface of the display, if this surface is visible.

EXAMPLE

Figure 9:
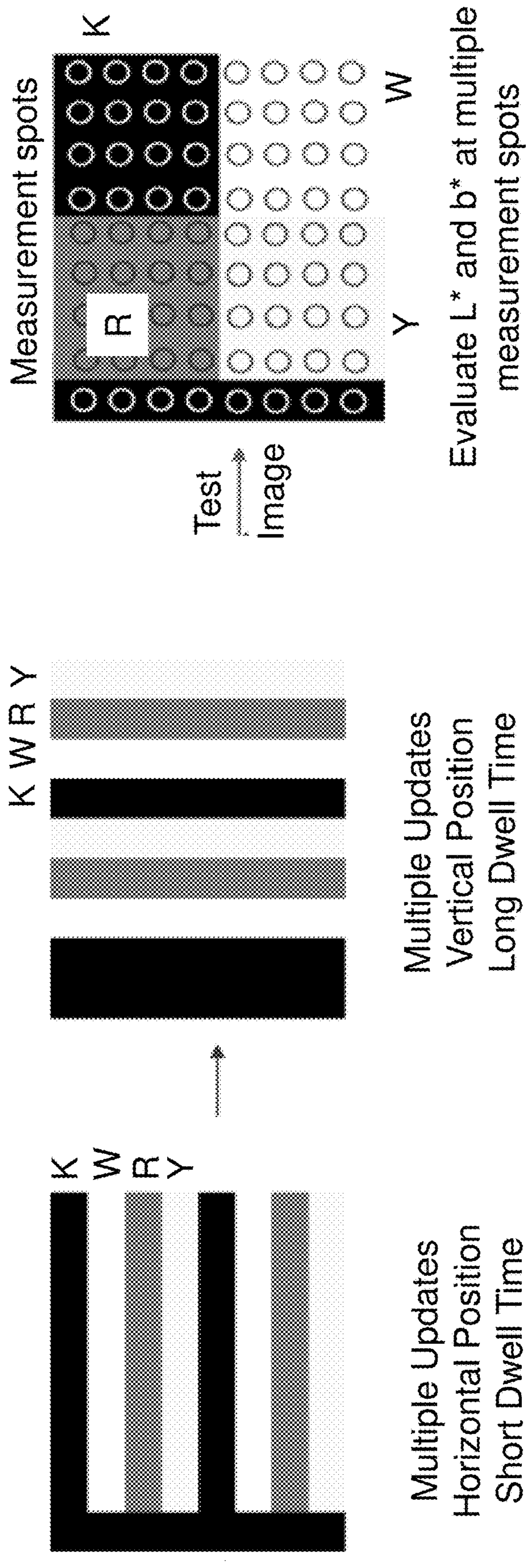
FIG. 9 shows a test protocol involving fast driving in a horizontal orientation to evaluate display panel performance, occasional driving in a vertical orientation to evaluate likely commercial use, and ultimate evaluation of specific test points using an electro-optic test bench. For the avoidance of doubt, K=black, W=white, Y=yellow, and R=red.

A four particle electrophoretic medium including black, white, yellow, and red particles of the type described above with reference to FIG. 1 was prepared and filled into an array of transparent microcells and sealed with an acrylate sealing layer. The array of microcells was laminated to a front transparent electrode (PET-ITO) and subsequently bonded to a thin-film transistor (TFT) backplane. The resultant display was arrange on an optical bench with a temperature controlled chuck that allows for horizontal and vertical positioning of the test display. As shown in FIG. 9, the panel is first driven in a horizontal orientation through a variety of patterns, with little to no dwell time between successive patterns. The horizontal pattern test pattern is recorded with video to ensure reliable switching between states and to check for “dead pixels” or other defects that may arise due to improper filling or sealing. After driving in a horizontal pattern to ensure that the panel is working correctly, the panel is re-oriented in a vertical position and run with multiple updates with a long dwell time between updates. This position and test sequence is intended to mimic real world condition in which the panel is typically installed in a vertical state and updated only occasionally. In this test the dwell time was 30 minutes, but it can be 60 minutes or longer. Total time of evaluation in the vertical orientation was three days. After three days of vertical driving, the display is evaluated for electro-optic performance using a spectrophotometric detector that measures L* and b* values at a plurality of measurement spots on the display, as shown in the right-most schematic of FIG. 9.

As shown in Table 1, below, when the test updates are performed at 0° C. with the waveforms of the type shown in FIGS. 5A, 6A, 7A, and 8A, the black measurement points have a large amount of variance after the extended vertical driving at low temperature. When viewed through an eye loupe or similar magnification, it is evident that the variability is primarily due to the black state being improperly contaminated (tinted) with white, yellow, and red pigment. However, when the panel is driven with waveforms of the type shown in FIGS. 5B, 6B, 7B, and 8B, the L* values of the resulting black measurement spots are lower, and the final L* values have less variance (high to low). Additionally, the b* values are closer to zero with much less variance. This data suggests that the waveforms of FIGS. 5B, 6B, 7B, and 8B and superior to the waveforms of FIGS. 5A, 6A, 7A, and 8A for driving a four-particle electrophoretic display in a vertical orientation at low temperatures.

TABLE 1

L* and b* values of various measurement spots in black field of test panel after driving in a vertical orientation, with 30 minute dwell time between updates, for 3 days with waveforms of the types described herein.

| Measurement | Waveforms of FIG. 5A, 6A, 7A, 8A | | Waveform of FIG. 5B, 6B, 7B, 8B | |
|---|---|---|---|---|
| spot number | L* | b* | L * | b* |
| 1 | 15.03 | −0.64 | 12.74 | −1.87 |
| 2 | 12.78 | −3.16 | 11.91 | −2.03 |
| 3 | 14.83 | 0.63 | 11.87 | −2.29 |
| 4 | 13.42 | −2.79 | 12.1 | −2.5 |
| 5 | 16.67 | 2.77 | 11.46 | −3.08 |
| 6 | 20.83 | 9.75 | 13.73 | 0.74 |
| 7 | 15.7 | 1.77 | 12.02 | −2.3 |
| 8 | 16.31 | 3.07 | 12.75 | −0.86 |
| 9 | 23.03 | 13.12 | 12.94 | −1.05 |
| TOTAL VARIANCE | 10.25 | 16.28 | 2.27 | 3.82 |

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A method of driving a display layer disposed between a viewing surface including a light-transmissive electrode and a second surface on the opposed side of the display layer from the viewing surface, the second surface including a driving electrode, the display layer including an electrophoretic medium comprising a fluid and first, second, third and fourth types of particles dispersed in the fluid, wherein the first, second, third and fourth types of particles have respectively first, second, third, and fourth optical characteristics differing from one another, the first and third types of particles having charges of a first polarity and the second and fourth types of particles having charges of a second polarity, opposite the first polarity, and the first and third types of particles do not have the same charge magnitudes, and the second and fourth types of particles do not have the same charge magnitudes, the method comprising the following steps in order:

(i) applying a first electric field having a high magnitude and the first or second polarity to drive the first or second types of particles towards the viewing surface, thereby causing the display layer to display the first or second optical characteristic at the viewing surface;

(ii) applying a second electric field having the high magnitude and a negative polarity;

(iii) applying a shaking pulse including at least four periods of the high magnitude electric field at the first polarity and at least four periods of the high magnitude electric field at the second polarity;

(iv) applying a third electric field having the high magnitude and the opposite polarity as step (i), wherein the third electric field is applied for the same amount of time as the first electric field, to drive the second or first types of particles towards the viewing surface, thereby causing the display layer to display the second or first optical characteristic at the viewing surface.

2. The method of claim 1, wherein each of steps (i)-(iv) are repeated.

3. The method of claim 1, wherein only the second or the first optical characteristic is displayed after completion of step (iv).

4. The method of claim 1, wherein the first electric field is applied for more than 400 ms.

5. The method of claim 1, wherein the second electric field is applied for more than 100 ms.

6. The method of claim 1, wherein each period of the shaking pulse is applied for less than 80 ms.

7. The method of claim 6, wherein each period of the shaking pulse is applied for about 40 ms.

8. The method of claim 1, wherein each electric field is applied in a direction that is substantially perpendicular to the direction of Earth's gravity.

* * * * *